United States Patent
White, III et al.

(10) Patent No.: US 7,430,692 B2
(45) Date of Patent: Sep. 30, 2008

(54) PROCESSOR OPERATIONAL STATUS MANAGEMENT SYSTEM

(75) Inventors: Stanford E White, III, Brighton, TN (US); Robert Walker, Gilbertsville, PA (US); Dino Calvarese, Oaks, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 11/751,171

(22) Filed: May 21, 2007

(65) Prior Publication Data

US 2007/0300228 A1    Dec. 27, 2007

Related U.S. Application Data

(60) Provisional application No. 60/805,008, filed on Jun. 16, 2006.

(51) Int. Cl.
G06F 11/00    (2006.01)

(52) U.S. Cl. .......................................... 714/48; 714/39

(58) Field of Classification Search ................... 714/39, 714/47, 48, 51; 709/224; 370/201; 379/416, 379/417
See application file for complete search history.

(56) References Cited

U.S. PATENT DOCUMENTS

| | | | |
|---|---|---|---|
| 5,008,827 A * | 4/1991 | Sansone et al. | 705/409 |
| 6,425,094 B1 * | 7/2002 | Drogichen et al. | 714/41 |
| 7,043,659 B1 | 5/2006 | Klein et al. | |
| 2002/0152421 A1 * | 10/2002 | Drogichen et al. | 714/11 |
| 2003/0067873 A1 * | 4/2003 | Fuhrmann et al. | 370/230 |
| 2003/0193890 A1 * | 10/2003 | Tsillas et al. | 370/216 |
| 2006/0015608 A1 | 1/2006 | Becker | |

* cited by examiner

Primary Examiner—Dieu-Minh Le
(74) Attorney, Agent, or Firm—Alexander J. Burke (57) ABSTRACT

A system inhibits alert monitoring during a predefined time period such as system maintenance by suppressing automatic communication of false alert messages to systems, on call personnel and availability reports and enables future scheduling of planned maintenance events, as well as real-time suppression of alerting during a chosen period. A system supports maintenance of one or more processing devices. The system includes a display processor for initiating generation of data representing at least one display image enabling a user to, select a processing device from multiple different processing devices intermittently receiving maintenance and schedule a time period for suppression of communication of alert messages indicating a failure condition of the selected processing device.

17 Claims, 7 Drawing Sheets

PROCESSOR OPERATIONAL STATUS MANAGEMENT SYSTEM

This is a non-provisional application of provisional application Ser. No. 60/805,008 by S. E. White III filed Jun. 16, 2006.

FIELD OF THE INVENTION

This invention concerns a system supporting maintenance of one or more processing devices involving suppression of communication of alert messages indicating failure of processing devices.

BACKGROUND INFORMATION

Operation of processing devices such as servers, computers etc. of complex systems is often monitored by a central software application. The central software application generates alert messages when particular system processing devices are not reachable, are not performing correctly, or have generated errors. This causes the problem of generation of false alert messages during planned maintenance of system processing devices when the devices are not available. Known systems typically address the problem of generation of false alert messages by user manual deletion of data identifying a processing device that is undergoing maintenance from a record identifying processing devices to be monitored by the central monitoring application. Another known system (maintenance application) allows a single monitored MICROSOFT WINDOWS® application to be placed into a maintenance mode by user manual command within a central monitoring application.

The deletion of device identifier data from a record identifying processing devices to be monitored by a central monitoring application, is a time consuming burdensome process, as is re-adding the identifier data after maintenance. Also there is a risk of deleting a device identifier of a wrong device and re-adding incorrect data after maintenance as well as of failing to re-add the data at all. Known systems further fail to comprehensively accommodate different types of processing devices including, network devices, Unix, VMS, Novell compatible devices and other types of objects (e.g., executable applications). One known system is restricted to enabling WINDOWS® devices to be modified by disallowing maintenance mode changes for newly installed devices. Further known systems involve pre-scheduling of maintenance times and the transition to maintenance mode and back to monitored mode is performed in response to user manual interaction. Known systems also require performance of error checking and validation of processing devices to ensure the devices exist and are correctly identified. These known systems also require the creation of an audit trail to record identification data of a user that input the maintenance mode times, for example. Also maintenance mode of known systems is typically limited to accommodate a single processing device and involves installation of a maintenance routine on all processing devices that are to be placed into maintenance mode. A system according to invention principles addresses these deficiencies and related problems.

SUMMARY OF THE INVENTION

A system inhibits alert monitoring during a predefined time period such as system maintenance by suppressing automatic communication of false alert messages to systems, on call personnel and availability reports and removes scheduled maintenance time periods from automatic calculation of downtime produced by operation monitoring software. A system supports maintenance of one or more processing devices. The system includes a display processor for initiating generation of data representing at least one display image enabling a user to, select a processing device from multiple different processing devices intermittently receiving maintenance and schedule a time period for suppression of communication of alert messages indicating a failure condition of the selected processing device.

DETAILED DESCRIPTION OF INVENTION

Figure 1:
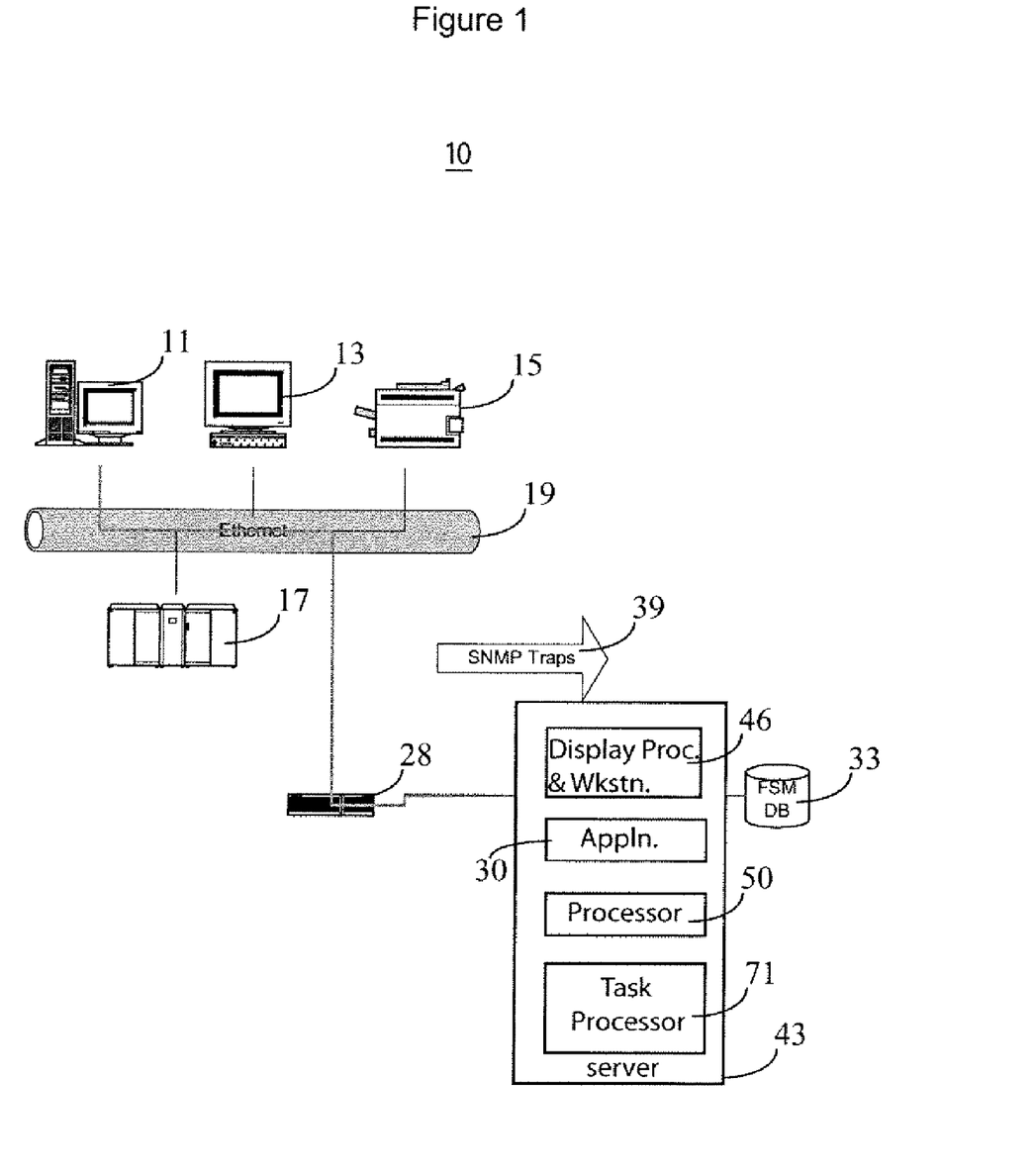
FIG. 1 shows a system supporting maintenance of one or more processing devices and inhibiting alert monitoring during a predefined time period such as system maintenance, according to invention principles.

FIG. 1 shows system 10 supporting maintenance of one or more processing devices and inhibiting alert monitoring during a predefined time period such as system maintenance. Centralized processing device monitoring applications typically record server, service or task outages as downtime in a report. Service Level Agreements between a service provider and a customer (SLAs) for system availability typically allow for the exclusion of scheduled maintenance time periods as part of the Agreement. System 10 inhibits alert monitoring during a predefined time period such as system maintenance, thereby removing the scheduled maintenance time periods from the automatic calculation of downtime produced by the central monitoring software that are reported per an SLA. System 10 places monitored processing devices into a non-alerting mode when planned maintenance is to be performed, thus suppressing false alerts automatically generated and provided to outage tracking systems, on call personnel and availability reports. System 10 enables future scheduling of these planned maintenance events, as well as real-time suppression of alerting during a selected period. This advantageous elimination of false reporting of service interruptions to support personnel results in resource savings, and removes scheduled downtime from device and service availability reports to provide a more accurate indication of service levels and forestalls contractual remedies that may be triggered by excessive inaccurate downtime.

A processor, as used herein, operates under the control of an executable application to (a) receive information from an input information device, (b) process the information by manipulating, analyzing, modifying, converting and/or transmitting the information, and/or (c) route the information to an output information device. A processor may use, or comprise the capabilities of, a controller or microprocessor, for example. The processor may operate with a display processor or generator. A display processor or generator is a known element for generating signals representing display images or portions thereof. A processor and a display processor comprise any combination of, hardware, firmware, and/or software.

An executable application, as used herein, comprises code or machine readable instructions for conditioning a processor to implement predetermined functions, such as those of an operating system, a context acquisition system or other information processing system, for example, in response to user command or input. An executable procedure (agent) is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A user interface (UI), as used herein, comprises one or more display images, generated by a display processor and enabling user interaction with a processor or other device and associated data acquisition and processing functions. The UI also includes an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application manipulates the UT display images in response to the signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity. Workflow comprises a sequence of tasks performed by a device or worker or both. An object or data object comprises a grouping of data, executable instructions or a combination of both or an executable procedure. A document or record comprises a compilation of data in electronic or paper form.

A workflow processor, as used herein, processes data to determine tasks to add to a task list, remove from a task list or modifies tasks incorporated on, or for incorporation on, a task list. A task list is a list of tasks for performance by a worker or device or a combination of both. A workflow processor may or may not employ a workflow engine. A workflow engine, as used herein, is a processor executing in response to predetermined process definitions that implement processes responsive to events and event associated data. The workflow engine implements processes in sequence and/or concurrently, responsive to event associated data to determine tasks for performance by a device and or worker and for updating task lists of a device and a worker to include determined tasks. A process definition is definable by a user and comprises a sequence of process steps including one or more, of start, wait, decision and task allocation steps for performance by a device and or worker, for example. An event is an occurrence affecting operation of a process implemented using a process definition, A Workflow Management System is a software system that manages processes. It includes a process definition function that allows users to define a process that should be followed and an Event Monitor which captures events from a Healthcare Information System and communicates the results to the Workflow Management System. A processor in the Management System tracks which processes are running, for which patients, and what step needs to be executed next, according to a process definition. The Management System includes a procedure for notifying clinicians of a task to be performed, through their worklists and a procedure for allocating and assigning tasks to specific users or specific teams.

System 10 eliminates automatic generation of alerts for specific processing devices when the processing devices are not available due to planned maintenance or upgrades. System 10 employs a monitoring application 30 and enables placement of different monitored processing devices (including, servers, switches, routers, etc.) into maintenance mode. System 10 further supports future scheduling and periodic scheduling of maintenance as well as tracking of use of an automated maintenance process and error free selection of devices concerned rather than manual entry of device name. In supporting maintenance, system 10 also enables user selection of multiple devices for maintenance, regardless of type as well as selection of extended timeframes for maintenance, by allowing an incremental extension (e.g., 30 minutes) to a time period for which alerting has been disabled. In addition, the system enables or disables scheduling options in response to role-associated permission data. System 10 reduces the number of false alert messages generated by a monitoring software application and thereby reduces a need for resources to respond to the alerts and increases accuracy of device availability reports provided in support of service level agreements.

System 10 addresses an inability to automatically turn off alerting of devices monitored by a central monitoring application either just prior to a planned device outage or well in advance of the planned outage as well as errors created by manual intervention in turning off (and back on) alert message generation. The system also addresses the inability to track status of alert message generation indicating generation has been automatically (and intentionally) turned off (or on) and reduces reporting errors concerning device availability and reliability caused by erroneous reporting of failure in processing devices undergoing maintenance. An erroneous report may incorrectly indicate a device as being failed or may fail to report that a device has completed maintenance and is available.

System 10 of FIG. 1 supports maintenance of one or more processing devices and inhibits alert monitoring during a predefined time period such as during system maintenance. Monitored devices including server 11, workstation 13, printer 15, computer 17 and network device 28 individually incorporate executable monitoring agents (or employ server based agents e.g. executing on server 43) which communicate SNMP (Simple Network Management Protocol) compatible trap messages 39 via (e.g., Ethernet) network 19 to centralized monitoring manager application 30 executing on server 43 in conjunction with workstation and display processor 46. Executable application 30 parses SNMP trap messages 39 to derive status change data (e.g., indicating change from operational to inoperative or operational data change) of respective devices and stores the status change data in status database 33. Executable application 30 initiates generation of alert messages to responsible personnel (e.g., via a helpdesk) in response to operational data exceeding a monitoring threshold. System 10 supports maintenance of one or more processing devices. Display processor 46 initiates generation of data representing display images enabling a user to, select a processing device from multiple different processing devices (e.g., server 11, workstation 13, printer 15, computer 17 and network device 28) intermittently receiving maintenance. The display images also enable a user to schedule a time period for suppression of communication of alert messages indicating a failure condition of the selected processing device. A processor in application 30 automatically initiates redstart of a processing device in response to a detected failure condition and inhibits re-start of the selected processing device during a scheduled period of alert message communication suppression.

Application 30 enables automatic placement of monitored processing devices into maintenance mode, either in response to user command entered via a displayed user interface image or in response to an executable procedure (e.g., a script) in a device shutdown sequence. Display images provided by display processor 46 also advantageously enable a user to schedule future device maintenance and schedule periodic maintenance of devices that are identified in status and monitoring database 33. The display images further ensure accurate error free selection of single or multiple monitored devices for maintenance and support incremental time extensions (e.g., 30 minutes) to a time period for which alerting has been disabled. This may occur, for example, if maintenance takes longer than planned. Selectable monitored devices comprise a wide variety of different devices including HVAC (Heating, Ventilation & Air conditioning) processing devices and transportation system processing devices, for example. The system is also advantageously usable in clinical task workflow, e.g., in an Intensive Care Unit (ICU) to inhibit alert message generation when a clinician is adjusting or re-attaching leads associated with signals for heart, respiration, or other monitored functions. An audit processor in application 30 automatically records data that tracks use of the automated maintenance process including user identifiers as well as data identifying actions requested and time and date of the associated commands. Application 30 is usable by a hosting site with many (e.g., thousands of) monitored servers, routers and switches, for example. Application 30 eliminates or reduces problems associated with manual removal of a device from being monitored by monitoring software. Such manual removal typically includes error prone manual steps involving communication with a monitoring software administrator, manual steps by the administrator to stop alert message generation and manual steps to reinstitute alert message generation in response to maintenance completion. User error and resource waste may occur in ignoring genuine particular device alerts out of habit or through ignorance that a device is no longer in maintenance. User error may also occur through response to a false alert message generated while a device is in maintenance.

Figure 2:
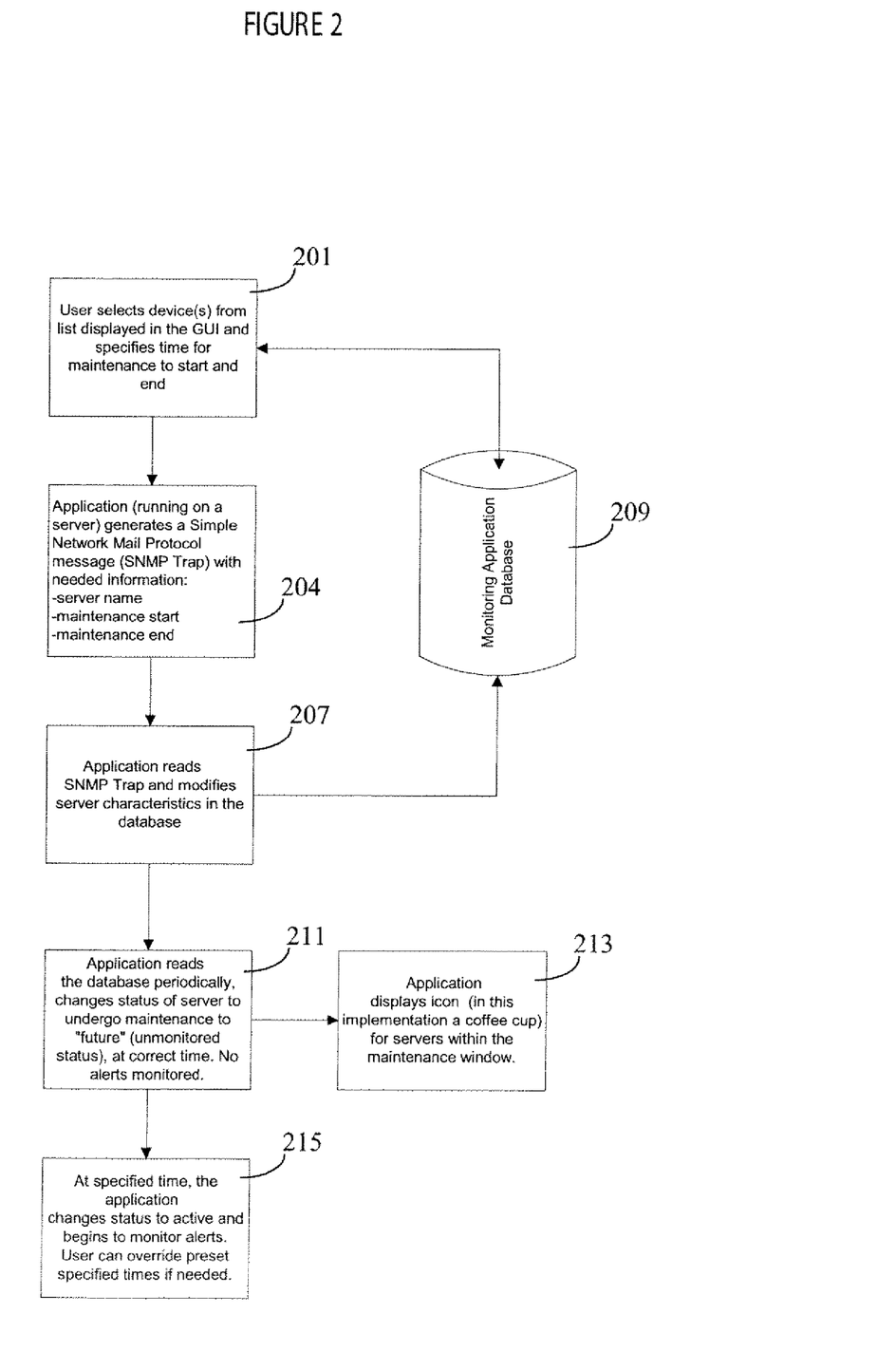
FIG. 2 shows a flowchart of a process used by a system supporting maintenance of one or more processing devices, according to invention principles
Figure 3:
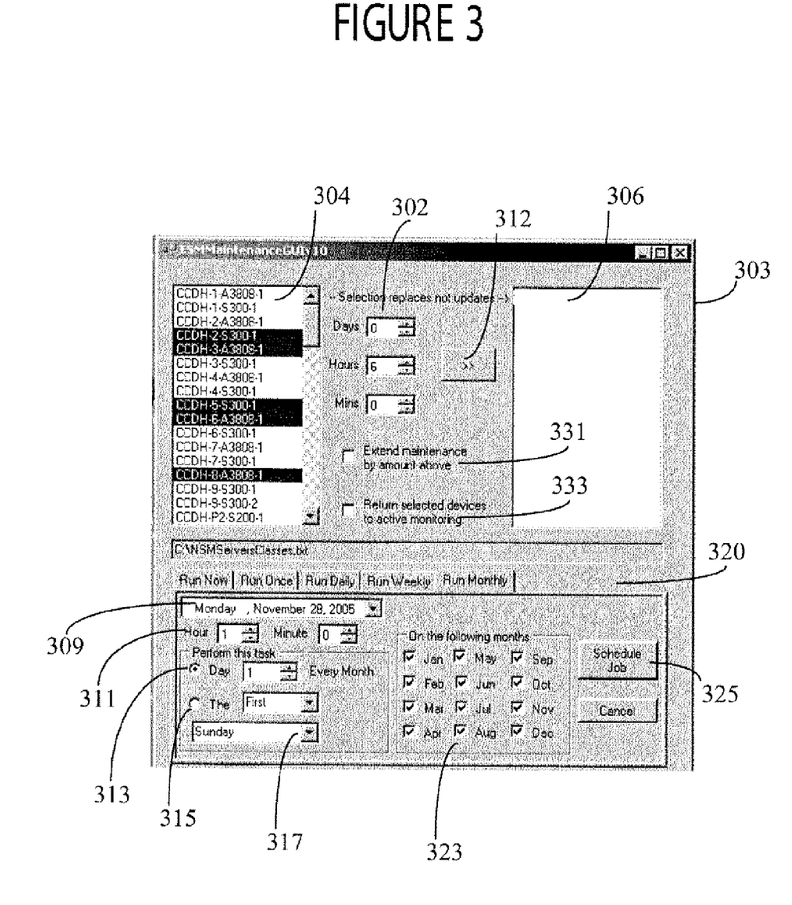
FIG. 3 shows a user interface image enabling a user to select and configure inhibiting alert monitoring of multiple devices during a predefined time period such as system maintenance, according to invention principles.
Figure 4:
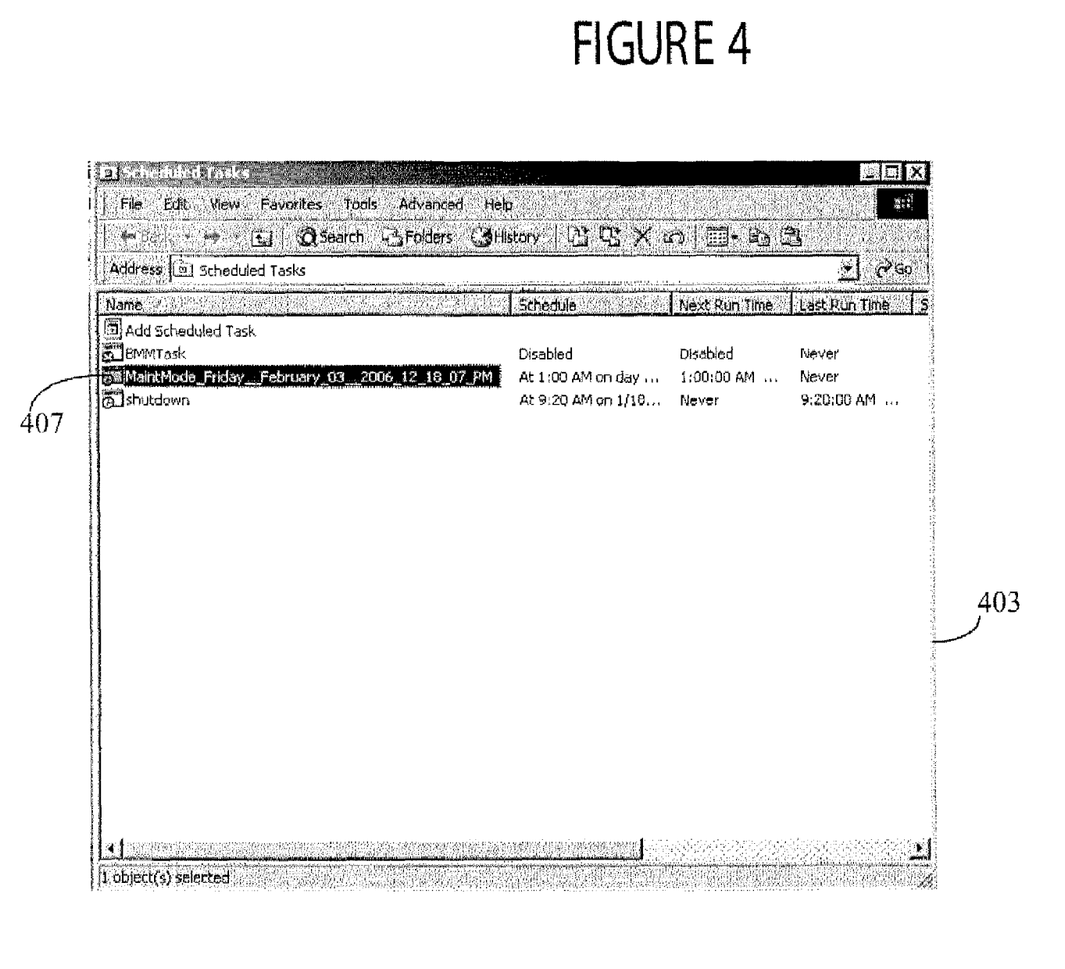
FIG. 4 shows a user interface image illustrating scheduled tasks resulting from configuration of inhibiting alert monitoring of multiple devices, according to invention principles.

FIG. 2 shows a flowchart of a process used by system 10 in supporting maintenance of one or more processing devices. In step 201, a user selects devices to be placed into maintenance mode together with time and date of start and end of the maintenance period via display images provided by display processor 46. Application 30 accesses data in device and status database 33 and retrieves a list of devices including WINDOWS®, Unix, VMS, Network Devices, and Switches, for example (such as server 11, workstation 13, printer 15, computer 17 and network device 28) that are currently being monitored. The devices are populated into the left hand pane of a display image such as image 303 illustrated in FIG. 3. Specifically, image 303 provided by display processor 46 enables a user to select and configure suppression of alert monitoring of multiple devices during a predefined time period such as system maintenance. Specifically, a user selects and includes devices to be placed into maintenance mode in window panel 306 from available devices in panel 304 by highlighting devices for selection in panel 304 and use of selection button 312. The period for maintenance is selected using days, hours and minutes boxes in column 302. Option 331 enables a user to select extension of the maintenance period by a predetermined period and option 333 enables termination of maintenance and return of devices to active status. A user is able to schedule a future period of maintenance by selection of a start date 309 and time in row 311. Periodic maintenance is scheduled by selection of a day in a month, via options in rows 313 (e.g., day 1 of every month) or 315 and 317 (e.g. the first Sunday of every month) and the months of a year in area 323. A user activates a selected schedule of maintenance using button 325. Selectable buttons in row 320 enable a user to initiate maintenance now, once, daily, weekly or monthly. FIG. 4 shows user interface image 403 provided by display processor 46 (FIG. 1) illustrating scheduled tasks resulting from configuration of inhibiting alert monitoring of multiple devices via image display 303 (FIG. 3). Specifically, image 403 indicates item 407 identifying a device scheduled for future maintenance and enabling access to the maintenance details (e.g., time, duration etc.) concerned.

In step 204 (FIG. 2) processor 50 generates and communicates an SNMP trap message to central monitoring application 30 in response to maintenance configuration data identifying at least one selected device and a scheduled time for maintenance entered by a user via user interface image 303 (FIG. 3) and other parameters determined via image 303. The communicated message includes data identifying, a device name, type of device and start and end times of period of maintenance. An exemplary SNMP trap message follows.

awtrap -h esm gr 1.3.6.1.4.1.791.2.9.2.2 6 12 1.3.6.1.4.1.791.2.2.3.1-s "ServerName: %1 Type: Monthly Downtime: %2 seconds Application: Scheduling.com Class: %3"

Where: awtrap=any third party utility to allow sending of a raw SNMP trap

Where: esmmgr=the name or location of the monitoring manager server.

Where: %1 is the computer name of the device to be placed in maintenance

Where: %2 is the amount of seconds the device is to be in maintenance

Where: %3 is the type of device that is to be placed into maintenance

Application 30 (FIG. 1) in step 207 parses the received SNMP trap message and initiates placement of the at least one selected device into an 'Unmanaged' state for the period of time specified by the start and end times of period of maintenance by updating data in step 209 (including server characteristics, for example) in status and monitoring database (e.g., a relational database or a finite state machine database) 33. Application 30 pseudo code for processing a maintenance trap is as follows.

```
Parse_Incoming_Msg(msgbody)
Is trap an alert for an agent resource that has failed or breached a
threshold?
   YES
      Is device in maintenance mode already?
      YES
         Ignore alert
      NO
         Process the trap and alert the appropriate party
   NO
   Is trap a request to place a device into maintenance?
   YES
      Place device into maintenance, change icon, and note status as in
      maintenance
   NO
      Process as normal
```

In another embodiment, processor 50 updates a database table such as in repository 33 or another repository in the system 10 network (not shown) in response to maintenance configuration data identifying at least one selected device and a scheduled time for maintenance entered by a user via user interface image 303 (FIG. 3) and other parameters determined via image 303. Central monitoring application 30 uses a MICROSOFT WINDOWS® compatible service that reads the database and identifies device maintenance requests using associated time stamp data in the database. This maintenance request initiation process advantageously facilitates device recovery and is more easily tracked than SNMP trap message processing. The modified data in database 33 provides updated parameters for incorporation in image display 303 such as a modified list of devices available for scheduling maintenance. In response to received SNMP trap messages identifying, a device is scheduled for future maintenance and a time of initiation of a maintenance period of the device, application 30 in step 211 intermittently (e.g., periodically) accesses and updates data in database 33 to indicate the device is in maintenance. Application 30 also ignores SNMP trap messages 39 that are received during the maintenance period and that indicate status change (e.g., identifying change from operational to inoperative) of respective devices indicated by data identifying an executable agent threshold breach, for example.

Executable agents employed by monitored devices 11, 13, 15, 17 and 28 (FIG. 1) for communicating SNMP trap messages 39 to application 30 may be individually configured to indicate different resources (e.g., time for an application to respond to a user command, as well as CPU, memory and input-output resources) exceed corresponding different thresholds. Further, if an executable agent detects that a threshold has been exceeded, the agent initiates communication of an SNMP trap message 39 to application 30 which parses the message to determine a threshold has been exceeded and updates status database 33 to indicate the threshold is exceeded and the new status of the device. Task (workflow) processor 71 automatically updates a task list of a worker (e.g., via network 19 and a helpdesk message, a pager, or other communication method) to indicate the threshold is exceeded and the device concerned needs attention to resolve the problem.

Figure 5:
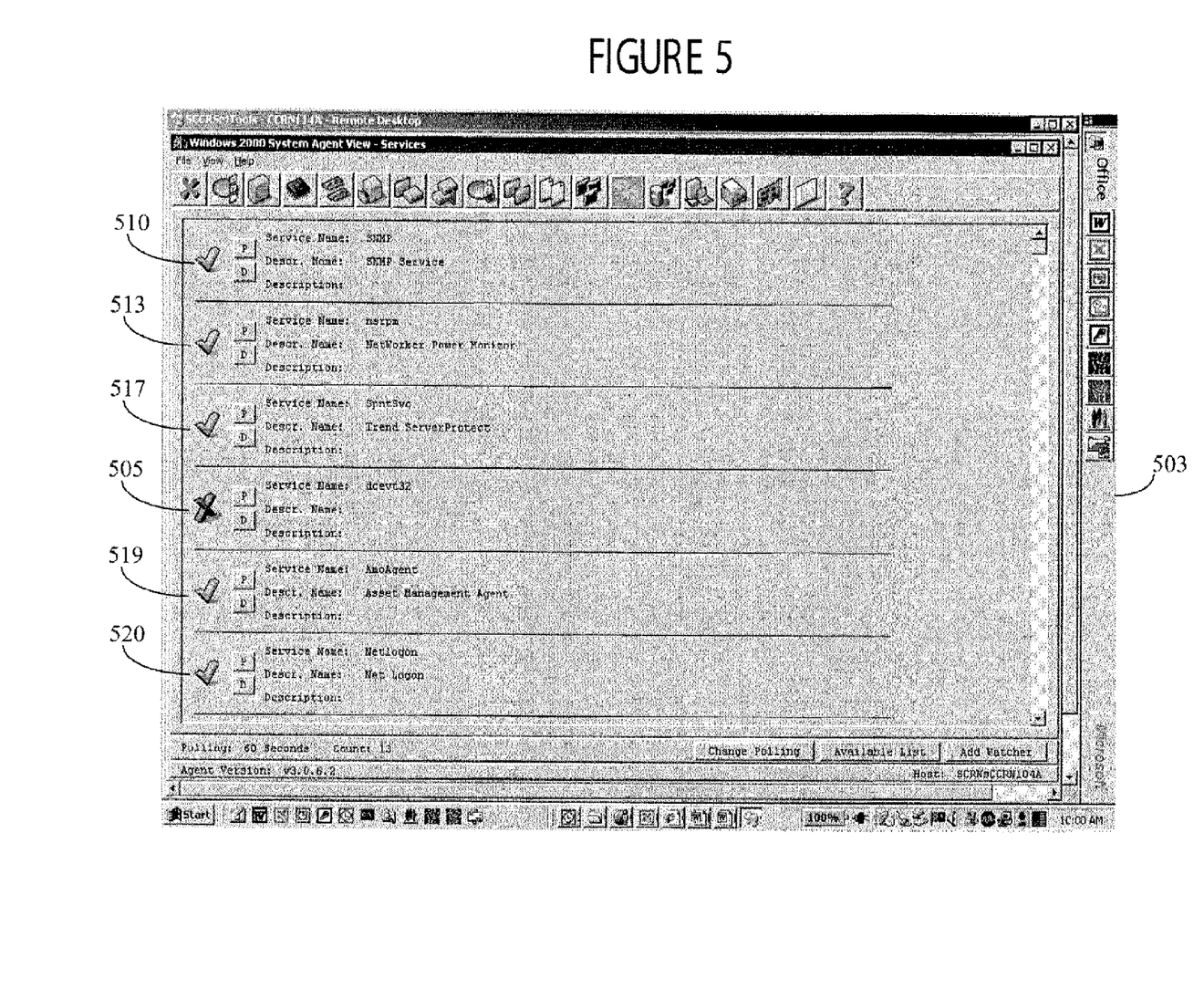
FIG. 5 shows a user interface image showing status of services provided by a system for monitoring operation of multiple devices, according to invention principles.

FIG. 5 shows user interface image 503 showing status of services (including devices) provided by application 30 through monitoring operation of multiple devices. Item 505 of image 503 illustrates that MICROSOFT WINDOWS™ Service Dctevt32 is inoperative and the services indicated by items 510, 513, 517, 519 and 520 are operational. Item 505 indicates Service Dctevt32 has failed or is stopped and a worker is contacted to analyze and act to resolve this failure. SNMP trap messages 39 (FIG. 1) that indicate such a status change and are identified in an associated SNMP trap message previously received in step 207 (FIG. 2) are discarded by application 30 until the device concerned returns to active (non-maintenance) status and is being monitored.

Figure 6:
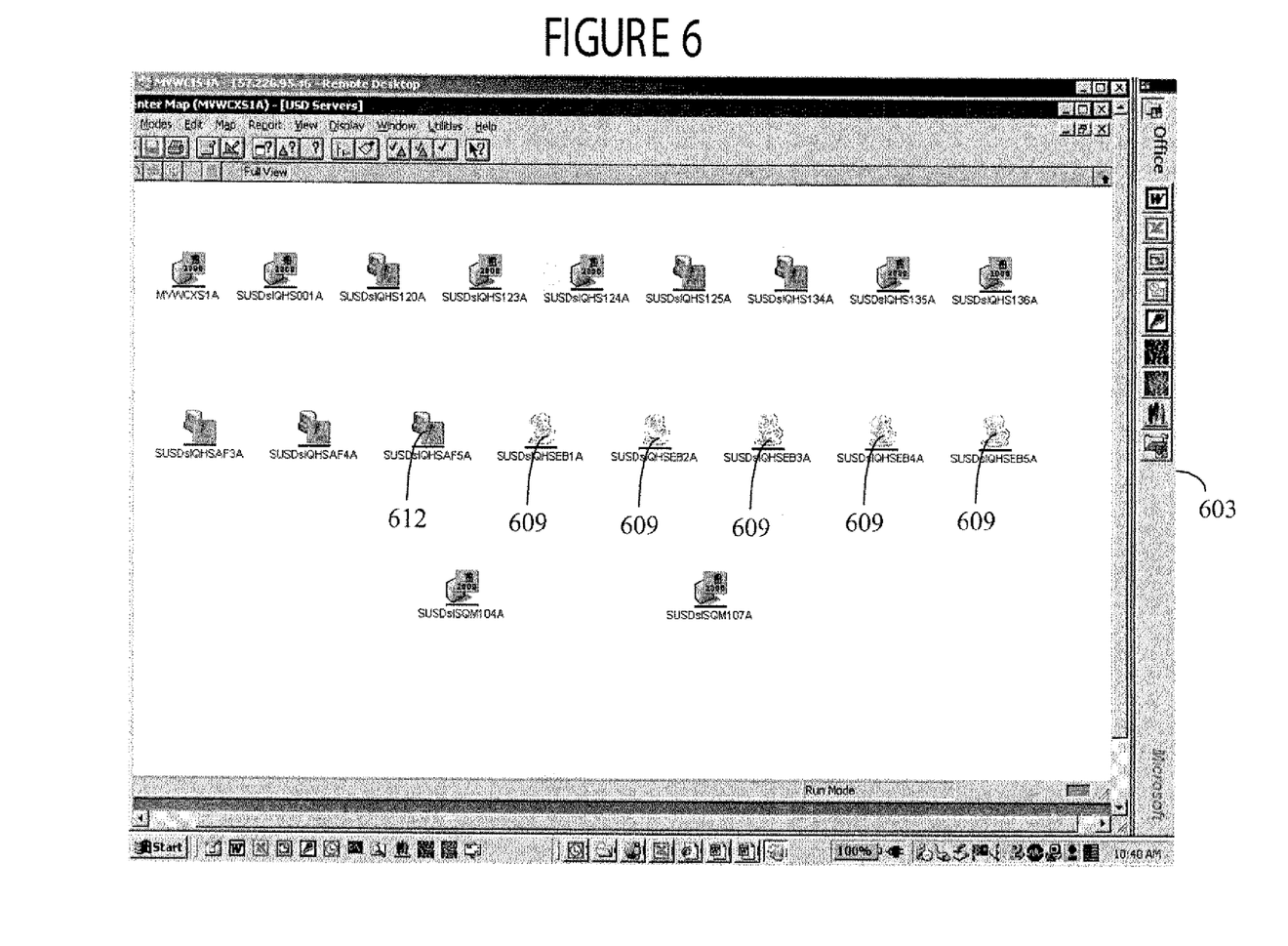
FIG. 6 shows a user interface image identifying processing devices in maintenance mode, according to invention principles.

In step 213 application 30 initiates generation of display image 603 of FIG. 6 identifying processing devices in maintenance mode. Displayed icons 609 (comprising Coffee Cups) indicate devices in maintenance mode for which associated SNMP trap messages 39 are ignored during the maintenance period. Upon Change in device status associated icons change from type 609 to type 612, for example. In step 215, application 30 interrogates the device to determine device status and if maintenance is completed successfully and the maintenance period is expired, updates database 33 to indicate the device has an active (non-maintenance) status and is being monitored. A user is able to override maintenance period data to extend a maintenance period via image display 303 (FIG. 3). In response to changing device status from maintenance to active, application 30 initiates generation of an alert message in response to an outstanding current alert condition for communication to a responsible worker as indicated by predetermined information in database 33 and the process of FIG. 2 ends.

Application 30 suspends monitoring of devices including, network, server, desktop computer, MICROSOFT WINDOWS® applications and Midrange or mainframe computers for a period of time to allow for scheduled work to be performed on a device without causing an automated alert message to be generated and communicated to a worker, for example. Application 30 is also able to suspend specific monitored functions and services within a device for maintenance rather than the entire device. This may occur for example, if individual WINDOWS® services are monitored for an active initiated state. Application 30, in response to user command, is able to disable monitoring of individual services on the device, while maintaining active monitoring of other services such as monitoring of disk space and memory utilization. This allows application 30 to place monitoring of an individual service or function into maintenance while not disabling monitoring of other core functions on the device.

In known systems alert messages concerning monitored devices are generated and communicated by paging a worker, for example and the worker analyzes if an event is due to someone performing maintenance on the device, or because there is a failure on the device. In contrast system 10 ensures alert messages are valid, enabling use of an automated process to perform self healing (such as re-start actions in response to a device failure diagnosis, for example) on devices, without conflict with planned (e.g., maintenance or other) work being performed on a device. For example, if services have failed on a device, system 10 does not attempt to restart the process or service (application function) automatically if it is in maintenance mode undergoing planned work. However if it is not in maintenance mode, system 10 (in response to a failure diagnosis) automatically tries a first line of automated defense by initiating re-start of the service. Application 30 advantageously improves self-healing and auto recovery by attaching an executable procedure (e.g., a script) to a generated alert message to initiate an action to occur as well as provide a user (or device) with an alert to a particular system condition. For example, if a service provided by a device is determined to be unavailable but not due to maintenance or performance of a software upgrade, a self-healing script may indicate:

If ALERT=SERVICEDOWN run script RESTARTS-VC.VBS

The RESTARTSVC procedure receives a name of the service that is unavailable, compares it against a list of names of services that are amenable to restart as a first line of defense and communicates a net start command to automatically restart the unavailable service if on the list. The procedure also communicates a message to a worker (e.g., via email) indicating that the service failed and following a successful restart attempt of the service and the alert was resolved.

In contrast in a known system, automatic re-start is typically not supported because it might interrupt or damage maintenance operations being performed on the device. In a known system a self-healing script may restart a service that was purposely stopped for a software upgrade or maintenance, for example, and corrupt the upgrade process. Whereas system 10 suppresses alert messages for devices in maintenance and automatically avoids these problems with known systems because alert messages are ignored during the period of time that an upgrade is occurring and also system 10 reduces need for root cause analysis of failures and need to track down a cause of failures that result from planned events.

In an example of operation of known systems, a device is monitored for ping (test message communication and response) to ensure that the device is operational and functioning. A software application is installed in the device (or installed elsewhere accessed by the device) that requires a reboot after installation and shuts the system down for a reboot. A monitoring application receives an alert message resulting from a failed ping test indicating the device has lost connectivity and communicates a message to a worker to initiate a failure investigation. The worker fails to connect to the device and erroneously begins a process to achieve site access and restart the device even though the device is only undergoing planned maintenance. In contrast in system 10, application 30 monitors a device using a ping test to ensure that the device is operational and functioning. A user employs image 303 (FIG. 3) and application 30 to schedule (or initiate) maintenance of the device and suppress alert message generation for the duration of maintenance prior to a device software upgrade and reboot of the device. Thereby, no alert messages are generated for the device during the maintenance period. Upon expiration of the maintenance time period the device is returned to operational status and active monitoring mode. So no worker time is wasted as a result of alert messages generated due to planned (e.g., maintenance) events.

In a further example of operation of known systems, at month end a system generates large report files that cause a device to operate at a high CPU utilization factor for several hours. The monitoring software detects the high CPU utilization factor and alerts a worker to identify a: root cause indicating why the CPU operates at high utilization. The worker analyzes the matter and identifies the report generation process that is absorbing CPU resources and contacts application owners to address the matter but thereby discovers it is not really a problem but a scheduled processor intensive event and the worker has been wasting his time. In contrast in system 10, at month end, large report files are generated that cause the device to run at a high CPU utilization factor for several hours during the generation of month end files. A user employs image 303 (FIG. 3) to schedule a maintenance period and suppress alert message generation for the timeframe of which the reports run and no erroneous alert messages are generated as a result of the CPU high utilization condition and worker time is not wasted addressing a planned event.

Suppression of alert messages during maintenance may involve alerts for maintenance of hardware, software and network capabilities, for example. When a device is placed into maintenance, application 30 suppresses all alerting (or a portion dependent on user configuration) for a device including hardware alerts, CPU loss, CPU utilization, memory utilization, paging space, disk space and fragmentation, disk and memory loss, throughput, service existence and/or activity, process existence and/or activity, network interface status, network throughput and errors and file system mount status. A processing device comprises a hardware device, software (e.g., executable code), a combination of the two or a network communication device or executable software.

Figure 7:
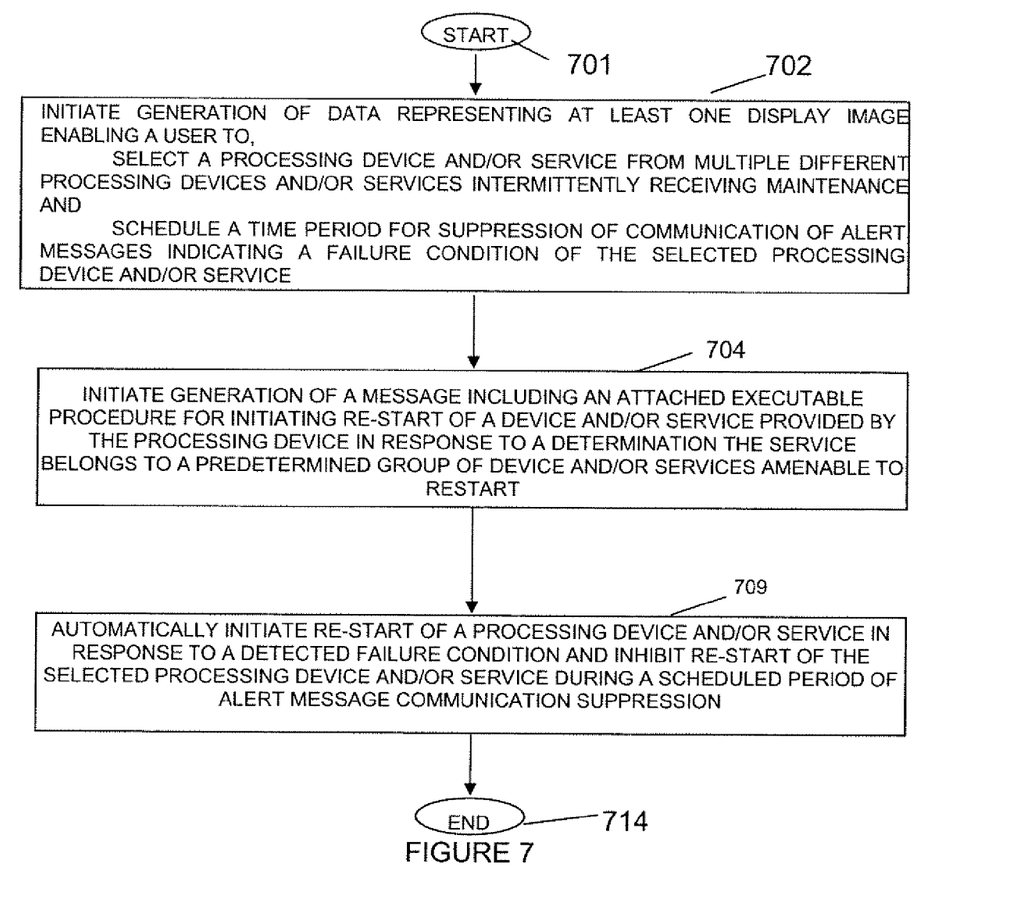
FIG. 7 shows a flowchart of a process employed by a system for inhibiting alert monitoring during a predefined time period such as system maintenance, according to invention principles.

FIG. 7 shows a flowchart of a process employed by a system for inhibiting alert monitoring during a predefined time period such as system maintenance (e.g., for a software upgrade). In step 702 following the start at step 701 workstation and display processor 46 (FIG. 1) initiates generation of data representing at least one display image enabling a user to, select a processing device and/or service from multiple different processing devices and/or services intermittently receiving maintenance and schedule a time period (designated by time and date) for suppression of communication of alert messages indicating a failure condition of the selected processing device and/or service. The suppression of communication of alert messages comprises inhibiting application 30 from initiating actions responsive to data indicating a failure condition. The failure condition includes a potential failure condition or an operational degradation condition. A failure condition of the selected processing device comprises, a hardware failure, a CPU failure, excessive CPU resource utilization, excessive memory utilization, excessive paging space utilization, excessive disk space utilization, excessive disk space fragmentation, a reduction in data throughput, a detected error condition and a network interface failure status.

Further, the at least one display image also enables a user to override a scheduled period of alert message communication suppression by terminating suppression and includes a schedule indicating one or more processing devices and associated time periods of alert message communication suppression. In step 704 a communication processor in application 30 initiates generation of a message providing a user (or device) with an alert to a particular system condition and including an attached executable procedure for initiating re-start of a processing device or service provided by the processing device in response to a determination the processing device or service belongs to a predetermined group of processing devices or services amenable to restart. A processor in application 30 in step 709 automatically initiates re-start of a processing device and/or service in response to a detected failure condition and inhibits re-start of the selected processing device and/or service during a scheduled period of alert message communication suppression. The process of FIG. 7 terminates at step 714.

The system, processes and image displays of FIGS. 1-7 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. A system for scheduling a time period for suppression of communication of alert messages indicating a failure condition of a selected processing device and/or service may be used in different data processing areas such, as healthcare, industry etc. The processes and applications operating on server 46 (FIG. 1) may in alternative embodiments, be located on one or more (e.g., distributed) processing devices accessing the network shown in FIG. 1 or remotely accessible from this network. Further, any of the functions and steps provided in FIGS. 1, 2 and 7 may be implemented in hardware, software or a combination of both and may reside on one or more processing devices located at any location of a network linking the FIG. 1 elements or another linked network including another intra-net or the Internet.

What is claimed is:

1. A system supporting maintenance of one or more processing devices comprising:
a display processor for initiating generation of data representing at least one display image enabling a user to,
select a processing device from a plurality of different processing devices intermittently receiving maintenance and
schedule a time period for suppression of communication of alert messages indicating a failure condition of said selected processing device; and
a processor for inhibiting initiating re-start of said selected processing device during a scheduled period of alert message communication suppression.

2. A system according to claim 1, wherein
said at least one display image enables a user to override a scheduled period of alert message communication suppression by terminating suppression.

3. A system according to claim 1, wherein
said suppression of communication of alert messages comprises inhibiting a monitoring application from initiating actions responsive to data indicating a failure condition.

4. A system according to claim 1, wherein
said failure condition includes at least one of, (a) a potential failure condition and (b) an operational degradation condition.

5. A system according to claim 1, wherein
said failure condition of said selected processing device comprises at least one of, (a) a hardware failure, (b) a CPU failure, (c) excessive CPU resource utilization, (d) excessive memory utilization, (e) excessive paging space utilization.

6. A system according to claim 1, wherein
said failure condition of said selected processing device comprises at least one of, (a) excessive disk space utilization (b) excessive disk space fragmentation, (c) a reduction in data throughput, (d) a detected error condition and (e) a network interface failure status.

7. A system according to claim 1,
a scheduled time period is designated by at least one of, (a) a time and (b) a date.

8. A system according to claim 1, wherein
said at least one display image includes a schedule indicating one or more processing devices and associated time periods of alert message communication suppression.

9. A system according to claim 1, wherein
said processing devices comprise at least one of, (a) a hardware device, (b) executable code and (c) a network communication device or executable software.

10. A system supporting maintenance of one or more processing devices, comprising:
a display processor for initiating generation of data representing at least one display image enabling a user to,
select a processing device from a plurality of different processing devices intermittently receiving maintenance and
schedule a time period for suppression of communication of alert messages indicating a failure condition of said selected processing device; and
a processor for automatically initiating re-start of a processing device in response to a detected failure condition and for inhibiting re-start of said selected processing device during a scheduled period of alert message communication suppression.

11. A system according to claim 10, including
a communication processor for initiating generation of a message including an attached executable procedure for initiating re-start of said processing device.

12. A system according to claim 11, wherein
said message including said attached executable procedure provides a user with an alert to a particular system condition.

13. A system according to claim 11, wherein
said message including said attached executable procedure provides a device with an alert to a particular system condition.

14. A system according to claim 10, including
a communication processor for initiating generation of a message including an attached executable procedure for initiating re-start of said processing device in response to a determination said processing device belongs to a predetermined group of processing devices amenable to restart.

15. A system according to claim 10, including
a communication processor for initiating generation of a message including an attached executable procedure for initiating re-start of a service provided by said processing device in response to a determination said service belongs to a predetermined group of services amenable to restart.

16. A system supporting maintenance of one or more services, comprising:
a display processor for initiating generation of data representing at least one display image enabling a user to,
select a service from a plurality of different services intermittently receiving maintenance and
schedule a time period for suppression of communication of alert messages indicating a failure condition of said selected service; and
a processor for automatically initiating re-start of a service in response to a detected failure condition and for inhibiting re-start of said selected service during a scheduled period of alert message communication suppression.

17. A system according to claim 16, including
a communication processor for initiating generation of a message including an attached executable procedure for initiating re-start of said service in response to a determination said service belongs to a predetermined group of services amenable to restart.

* * * * *